US007020998B1

(12) United States Patent
Kirkland et al.

(10) Patent No.: US 7,020,998 B1
(45) Date of Patent: Apr. 4, 2006

(54) PLANT STAKE HAVING ADJUSTABLE SUPPORT MEMBERS

(75) Inventors: Roy E. Kirkland, Johnston, SC (US); C. Eric Shuler, Saluda, SC (US)

(73) Assignee: K & S Arbor Products, LLC, Johnston, SC (US)

( * ) Notice: Subject to any disclaimer, the term of this patent is extended or adjusted under 35 U.S.C. 154(b) by 0 days.

(21) Appl. No.: 10/926,278

(22) Filed: Aug. 25, 2004

Related U.S. Application Data

(60) Provisional application No. 60/498,205, filed on Aug. 26, 2003.

(51) Int. Cl.
*A01G 9/12* (2006.01)
*A01G 17/04* (2006.01)

(52) U.S. Cl. ............................................. 47/47; 47/42

(58) Field of Classification Search ................ 47/32.5, 47/42, 43, 44, 47, 46; 248/156
See application file for complete search history.

(56) References Cited

U.S. PATENT DOCUMENTS

| | | | | |
|---|---|---|---|---|
| 350,281 | A | | 10/1886 | Wrightsman |
| 2,304,695 | A | * | 12/1942 | Kite ............................ 211/29 |
| 2,426,443 | A | * | 8/1947 | Fetterman ...................... 47/47 |
| 3,309,048 | A | * | 3/1967 | Rousselet .................... 248/87 |
| 3,397,485 | A | | 8/1968 | Peterson |
| 4,299,052 | A | | 11/1981 | Staudt |
| 4,381,621 | A | | 5/1983 | Eby |
| 4,584,792 | A | * | 4/1986 | Etzel ............................ 47/70 |
| D292,475 | S | | 10/1987 | Kitchen |
| 5,263,279 | A | * | 11/1993 | Delsanne et al. .............. 47/70 |
| 5,473,839 | A | | 12/1995 | Stidham |
| 5,605,010 | A | * | 2/1997 | Furlong et al. .............. 47/48.5 |
| 6,065,243 | A | * | 5/2000 | Mancini et al. ................ 47/42 |
| 6,702,239 | B1 | * | 3/2004 | Boucher ..................... 248/156 |

FOREIGN PATENT DOCUMENTS

| | | | | |
|---|---|---|---|---|
| DE | 29922993 | U1 | * | 3/2000 |
| FR | 2809925 | A1 | * | 12/2001 |
| GB | 2290934 | A | * | 1/1996 |
| JP | 2000228916 | A | * | 8/2000 |
| JP | 2000245273 | A | * | 9/2000 |
| JP | 2002112648 | A | * | 4/2002 |
| WO | WO95/31894 | | * | 11/1995 |

* cited by examiner

*Primary Examiner*—Son T. Nguyen
(74) *Attorney, Agent, or Firm*—Nelson Mullins Riley & Scarborough LLP

(57) ABSTRACT

A stake for supporting a newly planted tree or other plant. The stake has an elongated portion with a lower end which may be secured in the ground and an upper portion that is tied to the plant. At least one secondary support member is pivotally attached to the lower end of the elongated portion. The secondary support member extends in an approximately perpendicular manner from the elongated member. The secondary support member may be pivotally adjusted as desired for support.

1 Claim, 5 Drawing Sheets

PLANT STAKE HAVING ADJUSTABLE SUPPORT MEMBERS

PRIORITY CLAIM

This application claims priority to U.S. Provisional Application Ser. No. 60/498,205, filed Aug. 26, 2003, which is hereby incorporated by reference.

BACKGROUND OF THE INVENTION

The present invention generally relates to stakes for supporting plants. More particularly, the invention relates to tree stakes containing adjustable support members.

Newly planted trees are generally supported with stakes to prevent damage caused by the wind and assist in straight vertical development. At least two stakes are typically driven into the ground on opposing sides of the tree. A strap or rope is connected from each stake to the tree trunk to limit vertical movement of the tree.

Securing a tree with multiple stakes is a time consuming process, particularly when numerous trees must be planted. Moreover, it is difficult to carry each of the stakes and straps to the area where multiple trees are to be planted. Therefore, there is a need for a novel stake that overcomes these difficulties.

SUMMARY OF THE INVENTION

In one aspect, the present invention provides a stake for supporting a newly planted tree or other plant. The stake has an elongated portion with a lower end which may be secured in the ground and an upper portion that is tied to the plant. At least one secondary support member is pivotally attached to the lower end of the elongated portion. The secondary support member extends in an approximately perpendicular manner from the elongated member. The secondary support member may be pivotally adjusted as desired for support.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of references characters in the present specification and drawings is intended to represent more analogous features or elements of the invention.

DETAILED DESCRIPTION OF EXEMPLARY EMBODIMENTS

It is to be understood by one of ordinary skill in the art that the present invention is a description of exemplary embodiments only and is not intended as limiting the broader aspects of the present invention, which broader aspects are embodied in the exemplary constructions.

Figure 1:
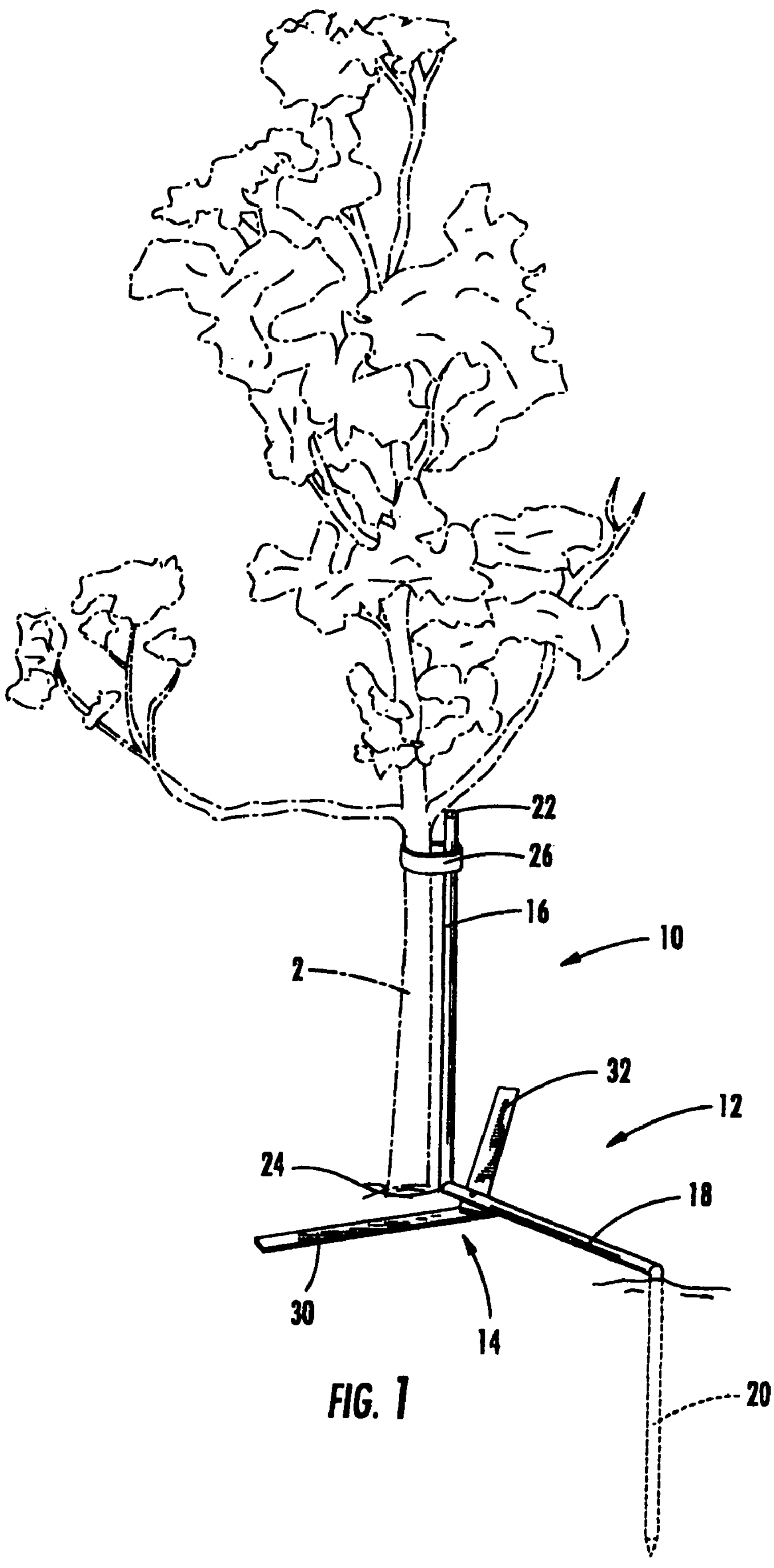
FIG. 1 is a perspective view of a stake constructed in accordance with the present invention.
Figure 2:
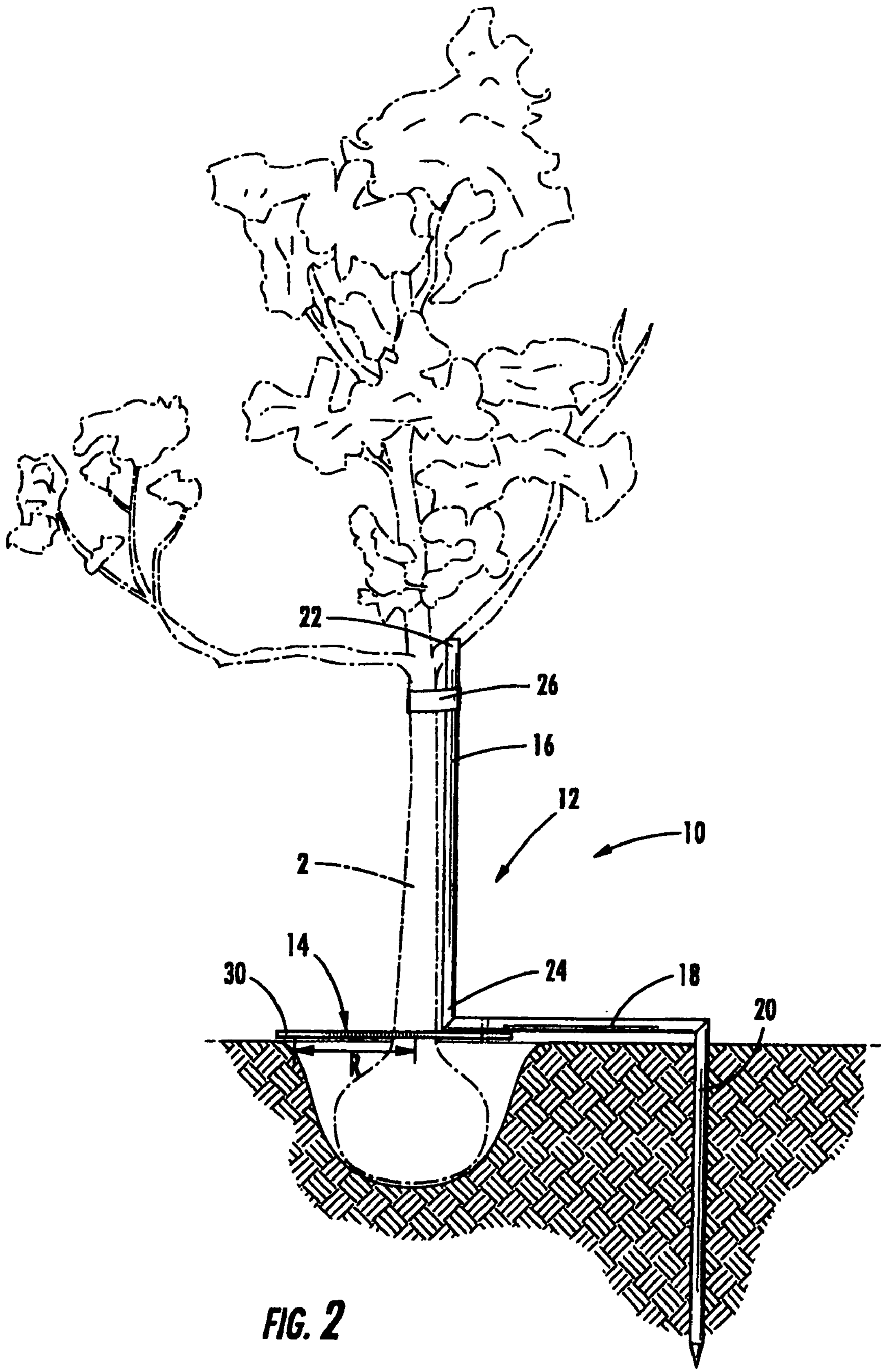
FIG. 2 is a side view of the stake of FIG. 1 supporting a tree.

FIGS. 1 and 2 illustrate a stake 10 for supporting a newly planted tree or other plant until root development occurs. While stake 10 will be described as supporting a tree, it should be understood by one of ordinary skill in the art, that stake 10 could be used for supporting other plants, such as shrubs or bushes.

Figure 3:
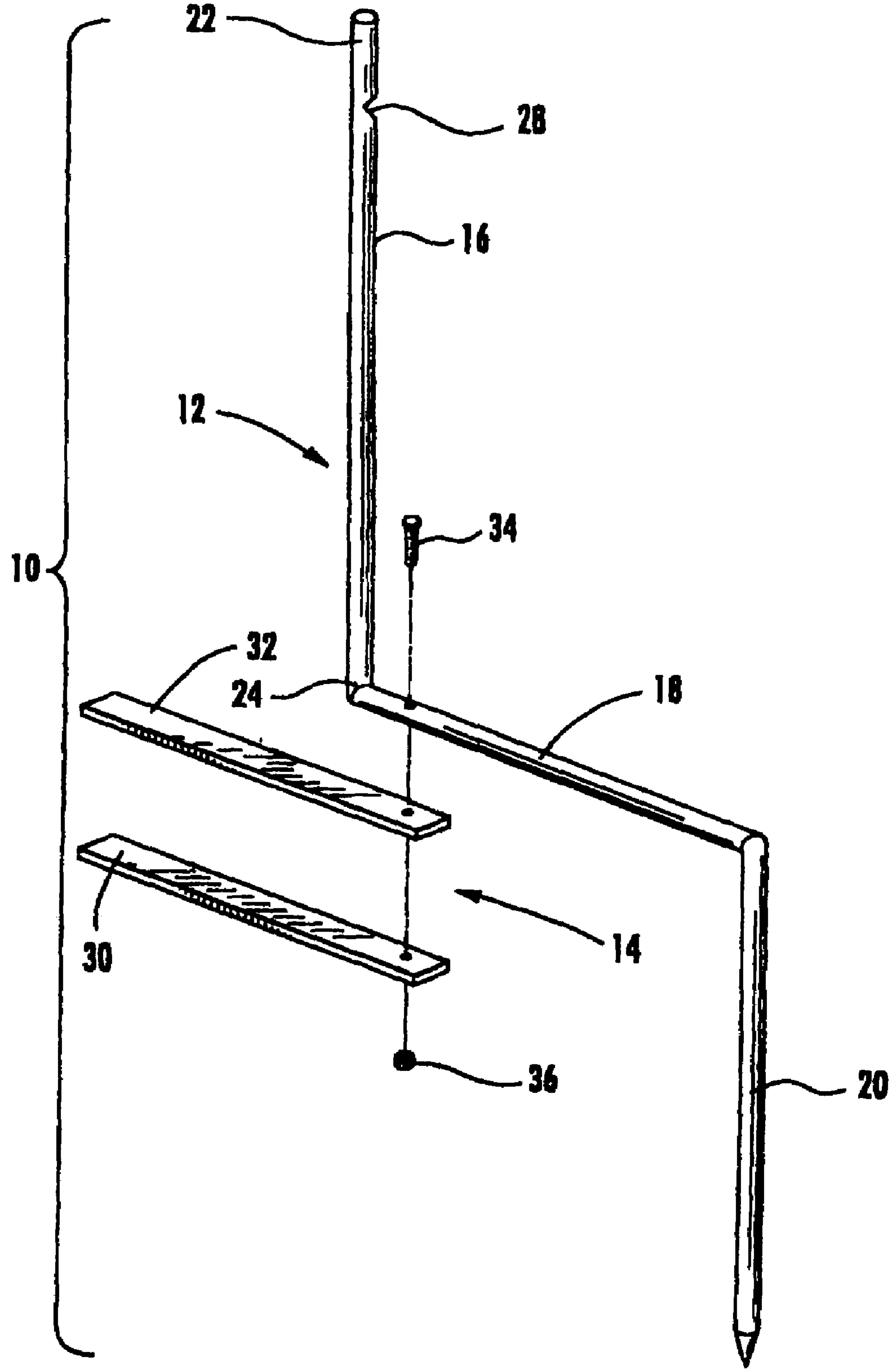
FIG. 3 is an exploded view of the stake shown in FIG. 1.
Figure 3A:
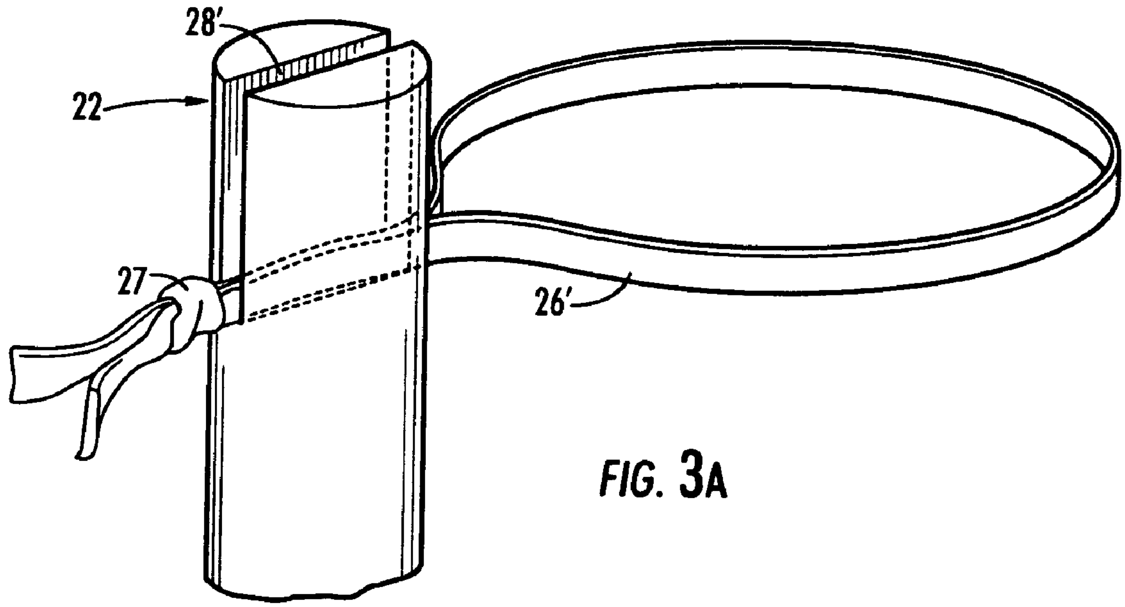
FIG. 3*a* is an enlarged view of the upper end of primary support's first portion according to another embodiment.
Figure 4:
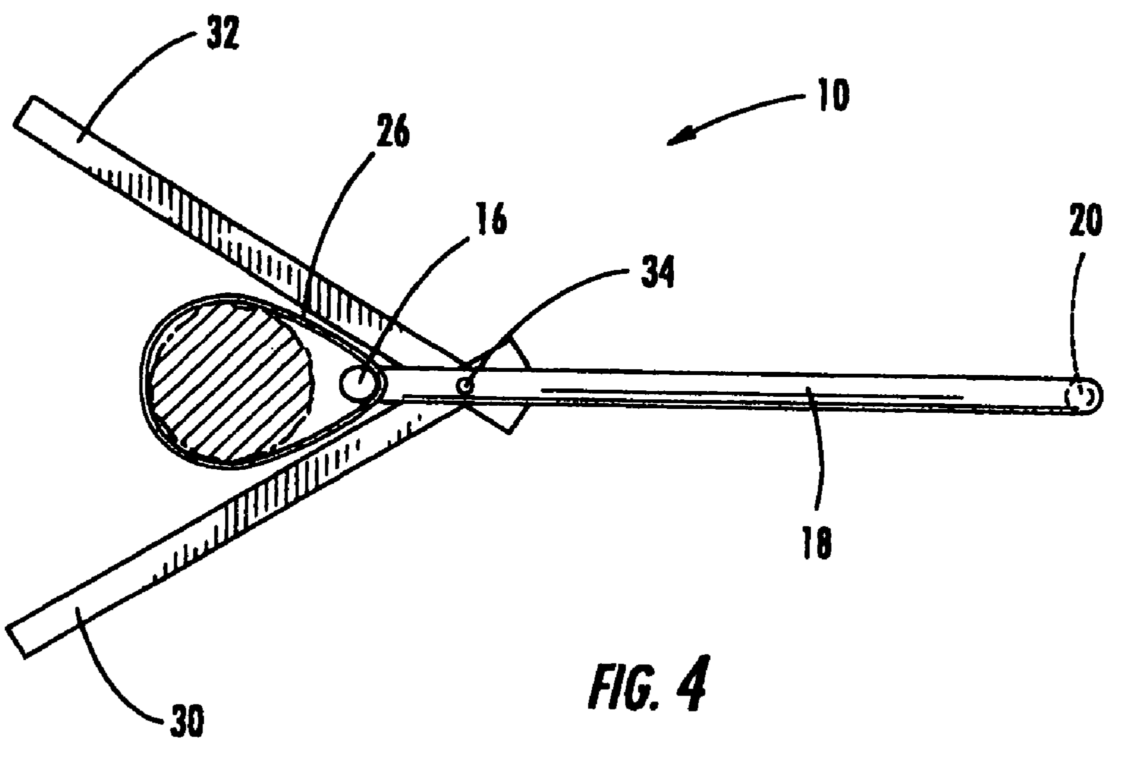
FIG. 4 is a top view of the stake shown in FIG. 2.

Stake 10 has a primary support 12 and a secondary support 14. As shown, primary support 12 includes an upper first portion 16, a second portion 18 and a lower third portion 20. First portion 16 has an upper end 22 and a lower end 24. First portion 16 may be connected to a tree trunk 2, preferably proximate to its upper end 22, using a strap 26 or other connector such that first portion 16 is substantially parallel with the tree trunk 2 (FIGS. 1 and 2). In one embodiment, first portion 16 has a notch 28 (best seen in FIG. 3) which retains strap 26 in a position proximate to its upper end 22. In another embodiment shown in FIG. 3A, a slot 28' is formed in upper end 22 of first portion 16. In this embodiment, a portion of strap 26' is received in slot 28'. As shown, a knot 27 is formed on an end of strap 26' to limit the movement of strap 26'. The length of first portion 16 will vary depending upon the height of the tree to be secured. In one embodiment, first portion 16 is approximately three feet in length. In another embodiments, for example, first portion 16 may be various other lengths, such as approximately one foot or approximately sixty-six inches.

Second portion 18 extends from lower end 24 of first portion 16 in a substantially perpendicular manner. The length of second portion 18 will vary depending upon the root ball size of the tree to be secured. For example, the length may be greater than the radius of the hole ("R") which was dug for the newly planted tree (See FIG. 2). As such, the length of second portion 18 would be sufficient so that third portion 20 extends past fill dirt to an area which is more compact. For example, second portion 18 may be approximately twenty inches in length. Such a length has been found to accommodate up to 45 gallon plant material. In another embodiments, for example, second portion 18 may be various other lengths, such as approximately sixteen inches or approximately five and one-quarter inches in length.

Third portion 20 extends downward from the distal end of second portion 18 in an approximately perpendicular manner. The distal end of third portion 20 may be tapered to ease placement into the ground. The length of third portion 20 should be sufficient to secure primary support 12 into the ground. In one embodiment, third portion 20 is approximately twenty-six inches in length. In other embodiments, for example, third portion 20 may be various other lengths, such as approximately thirty inches. It should be appreciated that first portion 16, second portion 18 and third portion 20 can be constructed as a unitary member or can be directly connected. Primary support 12 could be formed from any rigid material, such as hard plastic, wood or metal. In one embodiment, primary support 12 is formed from one-half inch steel pipe.

Secondary support 14 has at least one member that is pivotally connected to lower end 24 of first portion 16. This member or members provide support for the tree on the side opposite that of primary support 12. In one embodiment, secondary support 14 has a first member 30 and a second member 32 which pivot about the end of second portion 18 proximate to first portion 16. First member 30 and second member 32 may be pivotally adjusted as desired for support. While one of ordinary skill in the art would appreciate that various devices could provide the pivotal connection, a bolt 34 and lock nut 36 is used in the embodiment shown. The length of members 30 and 32 may vary depending upon the particular tree to be supported. In one embodiment, however, members 30 and 32 have a length of approximately seventeen inches. In other embodiments, members 30 and 32 may have various other lengths, such as approximately one foot or approximately four inches. To reduce the overall profile of stake 10 for transport or packaging, members 30 and 32 may be adjusted to be coplanar with second portion 18. Members 30 and 32 could be formed from any rigid material, such as hard plastic, wood or metal. In one embodiment, members 30 and 32 are formed from steel.

Strap 26 connects first portion 16 to the trunk 2 of a tree for support. Second portion 18 is flush with the ground while third portion 20 is embedded in the ground for support. As shown, the length of second portion 18 is sufficient so that third portion 20 may be embedded in the ground in a more compact area which has not been recently dug to plant the tree. First member 30 and second member 32 are angled with respect to each other as desired to support the tree.

Once the tree has been planted, third portion 20 may be driven into the ground so that first portion 16 is proximate and approximately parallel to the tree trunk 2. First member 30 and second member 32 are then adjusted to provide the desired support. Strap 26 is then tied to the tree trunk and upper end 22 of first portion 16. Strap 26 is preferably tied loosely to first portion 16 to allow for movement of the trunk 2 and taper development. Once the tree has grown sufficiently to no longer require support, stake 10 may be reused on a different tree. Both installation and removal time is reduced compared to traditional staking systems.

It should be understood that aspects of various embodiments may be interchanged both in whole or in part. Furthermore, those of ordinary skill in the art will appreciate that the foregoing description is by way of example only, and is not intended to be limitative of the invention.

What is claimed is:

1. A plant stake comprising:

a primary support having a first portion with an upper end and a lower end, a second portion extending approximately perpendicularly from said lower end of said first portion and a third portion extending approximately perpendicularly from said second portion, said third portion adapted to be inserted into the ground; and a secondary support connected to said primary support and being approximately perpendicular to said first portion of said primary support, said secondary support being angled to support a plant.

* * * * *